(12) United States Patent
Moore

(10) Patent No.: US 10,919,486 B1
(45) Date of Patent: Feb. 16, 2021

(54) PROTECTIVE COVERING DEVICE FOR DRIVERS AND PASSENGERS

(71) Applicant: Protect Your Clothes, LLC, Wilmington, NC (US)

(72) Inventor: Travis Moore, Wilmington, NC (US)

(73) Assignee: Protect Your Clothes, LLC, Wilmington, NC (US)

( * ) Notice: Subject to any disclaimer, the term of this patent is extended or adjusted under 35 U.S.C. 154(b) by 0 days.

(21) Appl. No.: 17/097,215

(22) Filed: Nov. 13, 2020

(51) Int. Cl.
*B60R 22/14* (2006.01)

(52) U.S. Cl.
CPC .................... *B60R 22/14* (2013.01)

(58) Field of Classification Search
CPC .. B60R 22/14; B60R 22/12; B60R 2021/0044
USPC ......................................... 297/464, 465, 468
See application file for complete search history.

(56) References Cited

U.S. PATENT DOCUMENTS

| | | | | |
|---|---|---|---|---|
| 3,690,696 A * | 9/1972 | Lincoln | ................... | B60R 22/04 280/803 |
| 4,437,628 A * | 3/1984 | Schwartz | ............... | B64D 25/06 244/122 AE |
| 4,759,569 A * | 7/1988 | Potter | ..................... | B60R 21/18 280/748 |
| 5,926,846 A * | 7/1999 | Segal | ................... | A47D 13/086 2/102 |
| 6,601,916 B1 * | 8/2003 | Kamiki | ............... | B60N 2/2812 297/250.1 |
| 7,131,703 B1 * | 11/2006 | Sheridan | ............... | B60R 22/105 297/465 |
| 7,954,172 B2 * | 6/2011 | Hepler | .................... | B60R 22/14 2/75 |
| 10,391,898 B1 * | 8/2019 | Richards | ................ | B60N 2/688 |
| 2018/0125124 A1 * | 5/2018 | Jylkka-Tesler | ......... | A41D 11/00 |
| 2020/0114863 A1 * | 4/2020 | Radion | ................... | B60R 22/26 |
| 2020/0353891 A1 * | 11/2020 | Turjeman | ............... | B60N 2/265 |

* cited by examiner

*Primary Examiner* — Mark R Wendell
(74) *Attorney, Agent, or Firm* — Dogwood Patent and Trademark Law; Ashley D. Johnson

(57) ABSTRACT

The presently disclosed subject matter is generally directed to a protective device that can be used to protect the clothing of a user and the interior of a vehicle due to inadvertent food and beverage spills. The device includes an upper section that covers at least a portion of the torso of a user, while leaving the user's hands and arms free for controlling a vehicle. The device further includes a lower section for covering at least a portion of the user's lap and thighs. Advantageously, the device includes a fold that extends from the upper section. The fold has the dual purpose of protecting the vehicle seat belt when in use and adhering the device in place. The device includes a top absorbent layer for containing liquid and food spills, and a lower impermeable layer for prevent liquid spills from contacting the user's clothing or the vehicle.

20 Claims, 17 Drawing Sheets

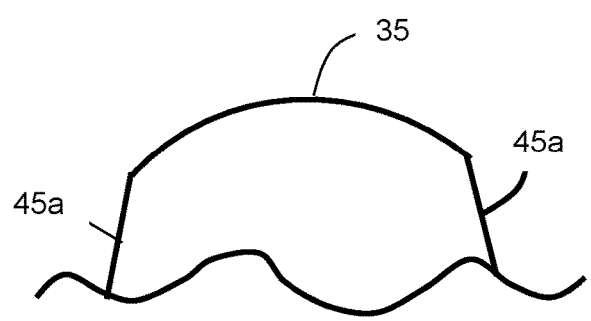
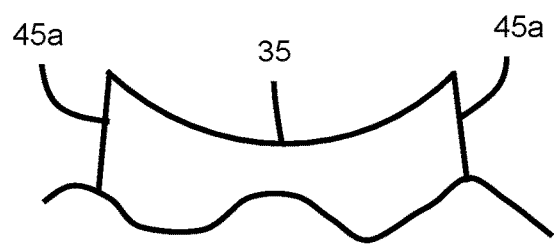
Fig. 4a    Fig. 4b
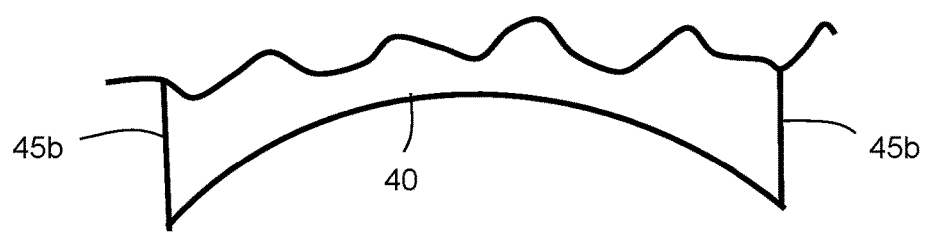
Fig. 4c
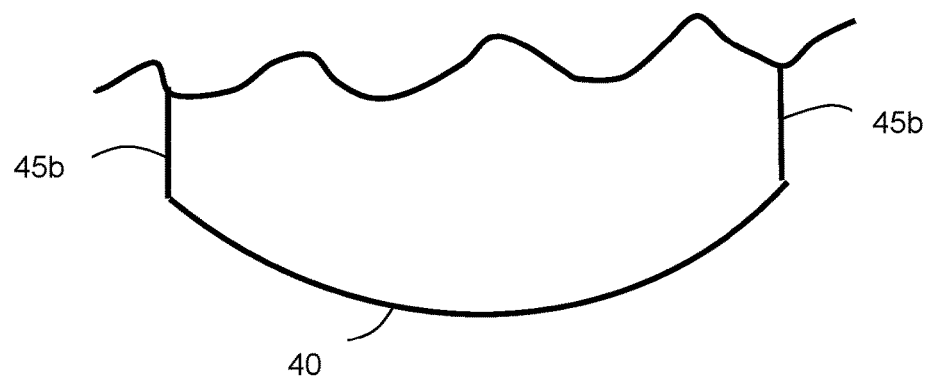
Fig. 4d

PROTECTIVE COVERING DEVICE FOR DRIVERS AND PASSENGERS

TECHNICAL FIELD

The presently disclosed subject matter relates generally to protective covering devices for use with seated users, such as vehicle drivers and passengers.

BACKGROUND

Eating and drinking while seated in a motor vehicle is increasingly popular today, as people continually seek ways to save time. This has become even more prevalent with the convenience of drive through fast-food restaurants. For example, many commuters skip breakfast at home, stop at a fast food outlet on their way to work, and eat their breakfast during the reminder of their drive. In addition, many carpool drivers and passengers routinely eat on their way to and from work. Further, people with sales or other travel jobs frequently eat meals in the car while they move between locations or between meetings. However, eating and drinking while in a moving vehicle increases the likelihood of accidental spills, which can be inconvenient and problematic. For example, staining of clothing can be costly, often requiring special cleaning or ruining an item of clothing if a stain cannot be removed. Further, the spilling of food and beverages on clothing is aggravating, resulting in the need to wear stained or soiled clothing for the entire workday. Prior art covering devices protect a portion of the user's clothing but leave the vehicle seat belt exposed. Over time, the seat belt often becomes unsightly and dirty as stains accumulate. It would therefore be beneficial to provide a device that protects the user's clothing as well as the associated seat belt of the vehicle.

SUMMARY

In some embodiments, the presently disclosed subject matter is directed to a device for use by a user seated in a vehicle having a vehicle seat belt. Particularly, the device comprises a body defined by: an upper section for covering at least a portion of the user's front torso while leaving the user's arms and hands uncovered and a lower section extending from the upper section, adapted to cover the seated user's lap and thighs. The body comprises a front face, an opposed rear face, an upper edge, a lower edge, and a pair of opposed side edges. The body includes at least one fold line positioned in an upper corner of the device, the fold line adapted to allow the upper corner to be folded towards the rear face of a device such that when the device is used with a vehicle seat belt chest strap, the fold is held in place against a user's torso by the tension of the fastened seat belt chest strap. The device includes an absorbent layer for absorbing liquid spills and a lower impermeable layer for preventing liquid spills from contacting the seated user or the vehicle.

In some embodiments, the upper section side edges are angled between the top edge and the lower section side edges.

In some embodiments, the upper corner of the device comprises a first securing element that cooperates with a second securing element on the body to maintain the folded configuration.

In some embodiments, the first and second securing elements are selected from one or more magnets, clips, ties, buttons, hook and loop closures, snaps, or fasteners.

In some embodiments, the absorbent layer is positioned adjacent to the front face of the device, and wherein the front face of the device is the farthest face from the user's lap and thighs.

In some embodiments, the lower impermeable layer is positioned adjacent to the rear face of the device, and wherein the rear face of the device is adjacent to the user's lap and thighs.

In some embodiments, the upper section is pivotable or foldable about the fold line.

In some embodiments, the device further includes a flap positioned on the rear face of the device, wherein the flap is positioned on the lower third of the rear face and is configured to tuck into a waist belt portion of a seat belt.

In some embodiments, the upper section comprises a left-side and right-side fold line.

In some embodiments, the fold line is a scored line, a crease, a perforated line, a seam, or combinations thereof.

In some embodiments, the folded upper corner comprises a channel sized and shaped to house the fastened vehicle seat belt chest strap using the tension of the fastened seat belt chest strap to hold firmly against the torso of the user.

In some embodiments, the lower impermeable layer is waterproof, liquid impermeable, or both.

In some embodiments, the device further includes an outer cover that spans at least one of the top and rear faces.

In some embodiments, the presently disclosed subject matter is directed to a method of containing food and beverage spills while seated in a vehicle. The method comprises positioning a device over at least a portion of a user's upper torso, lap, and thighs. The device comprises a body defined by: an upper section for covering at least a portion of the user's front torso while leaving the user's arms and hands uncovered and a lower section extending from the upper section, adapted to cover the seated user's lap and thighs. The body comprises a front face, an opposed rear face, an upper edge, a lower edge, and a pair of opposed side edges. The body includes at least one fold line positioned in an upper corner of the device, the fold line adapted to allow the upper corner to be folded over a vehicle seat belt chest strap. The device includes an absorbent layer for absorbing liquid spills and a lower impermeable layer for preventing liquid spills from contacting the seated user or the vehicle. The method comprises positioning an upper corner of the device to a folded position up and over the seat belt, held in place against the torso of a user by the tension of the fastened upper seat belt chest strap, covering and providing stain protection to a top portion of the vehicle seat belt chest strap. Spills from the user while seated are contained by the device and do not contact the user's clothing or the vehicle.

In some embodiments, the upper corner of the device comprises a first securing element that cooperates with a second securing element on the body to maintain the folded configuration.

In some embodiments, the folded position is maintained in position by the first and second securing elements selected from one or more magnets, clips, ties, buttons, hook and loop closures, snaps, or fasteners.

In some embodiments, the fold is maintained in position against the upper torso by the tension of the fastened seat belt chest strap.

In some embodiments, the absorbent layer is positioned adjacent to the front face of the device, and wherein the front face of the device is the farthest face from the user's lap and thighs.

In some embodiments, the lower impermeable layer is positioned adjacent to the rear face of the device, and wherein the rear face of the device is adjacent to the user's lap and thighs.

In some embodiments, the upper corner is folded into a channel sized and shaped to house at least a portion of the vehicle seat belt chest strap.

In some embodiments, the method further comprises removing the device from the user, washing the device, and reusing the device.

BRIEF DESCRIPTION OF THE DRAWINGS

The previous summary and the following detailed descriptions are to be read in view of the drawings, which illustrate some (but not all) embodiments of the presently disclosed subject matter.

FIG. 2b is a side plan view of the device of FIG. 2a.

FIGS. 4a and 4b are fragmentary top plan views of device top edges in accordance with some embodiments of the presently disclosed subject matter.

FIGS. 4c and 4d are fragmentary top plan views of device bottom edges in accordance with some embodiments of the presently disclosed subject matter.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

Figure 1:
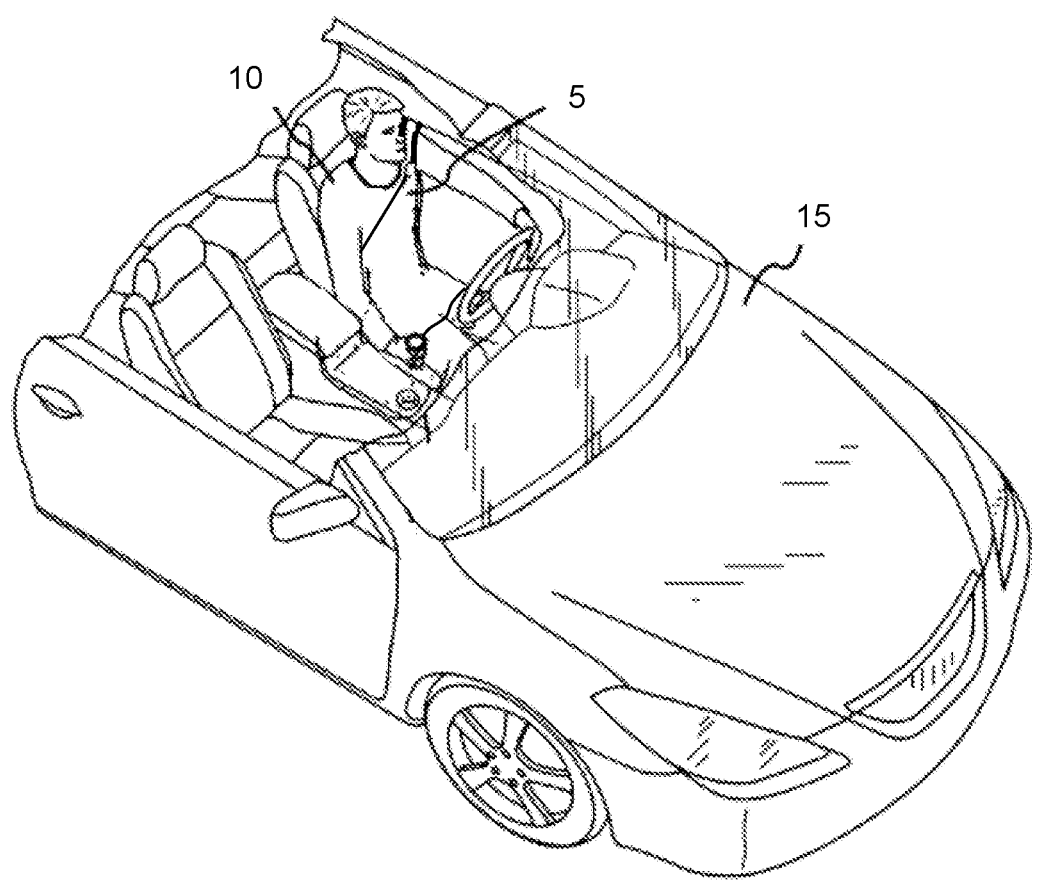
FIG. 1 is a perspective view of a device in use in accordance with some embodiments of the presently disclosed subject matter.

The presently disclosed subject matter is generally directed to a covering device that can be used to protect the clothing of a user and the interior of a vehicle resulting from inadvertent food and beverage spills. As shown in FIG. 1, device 5 includes an upper section that covers at least a portion of the torso of user 10, while leaving the user's hands and arms free for controlling vehicle 15. As used herein, "user" can include the driver and/or passenger(s) of the vehicle. The device further includes a lower section for covering at least a portion of the user's lap and thighs. Advantageously, the device includes a fold that extends from the upper section. The fold has the dual purpose of protecting the vehicle seat belt when in use and maintaining the device in place. The device includes a top absorbent layer for containing liquid and food spills, and a lower impermeable layer for prevent liquid spills from contacting the user's clothing or the vehicle.

Figure 2A:
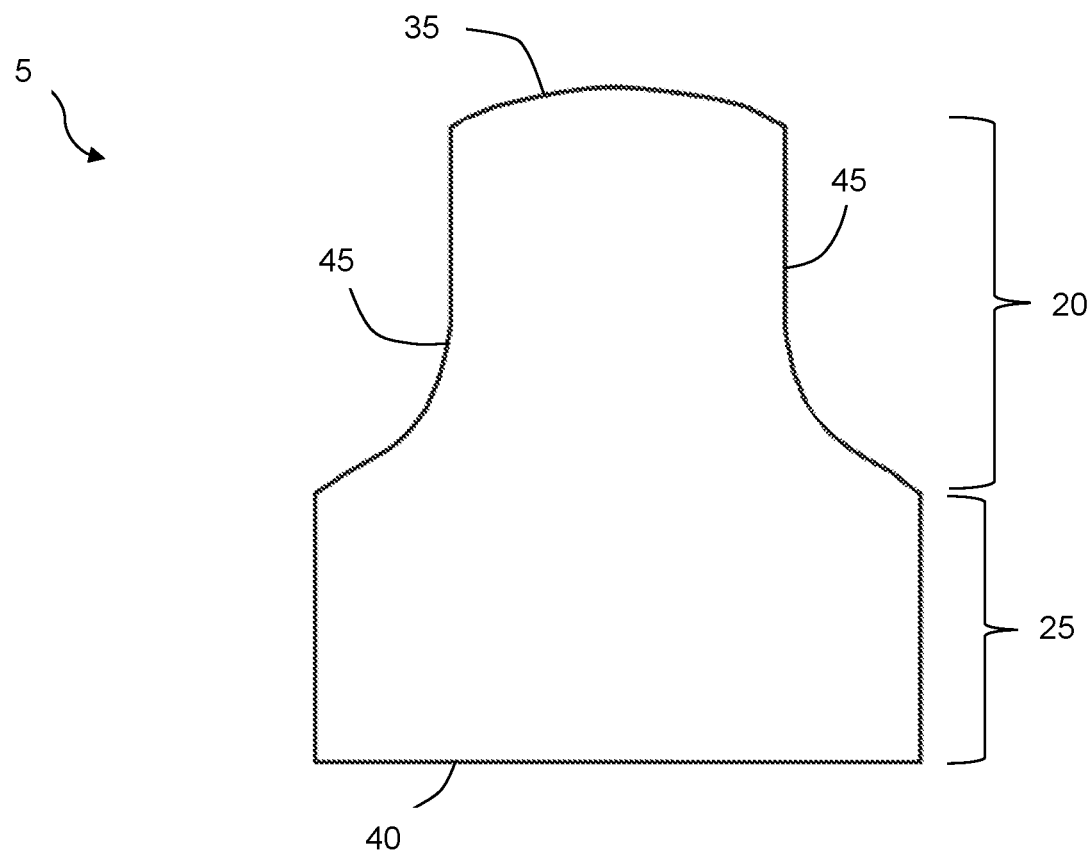
FIG. 2a is a top plan view of a device in accordance with some embodiments of the presently disclosed subject matter.

FIG. 2a illustrates one embodiment of device 5 comprising a flat body defined by a length and a width. The device includes upper section 20 and lower section 25 that extends downwardly from the upper section. The term "upper section" refers to the portion of the device that at least partially covers the user's chest and torso when in use. The term "lower section" refers to the portion of device 5 that at least partially covers the user's lap and thighs when in use. In some embodiments, lower section 25 is configured to be wider than the upper section to extend to the sides of the user's lap, thereby protecting the vehicle seats and interior from spills. The device further includes top edge 35, bottom edge 40, and opposed side edges 45.

Figure 2B:
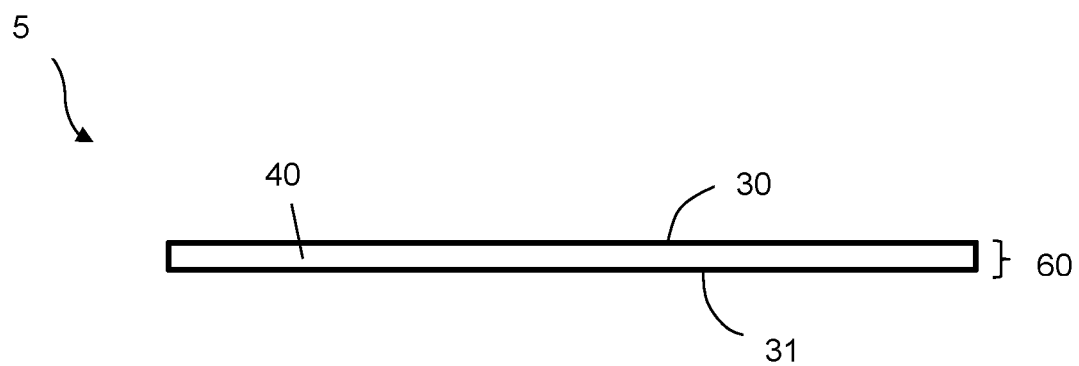

As shown in FIG. 2b, the device also includes front face 30 and opposed rear face 31, with interior 40 therebetween. The rear face of the device is in direct contact with the user's lap and/or thighs. The opposed front face extends away from the user into the external environment. As described in more detail herein below, the device interior includes at least one absorbent layer to catch food and beverage spills, as well as one or more impermeable layers to ensure that spills do not escape onto the user's clothing or the car interior.

Figure 3A:
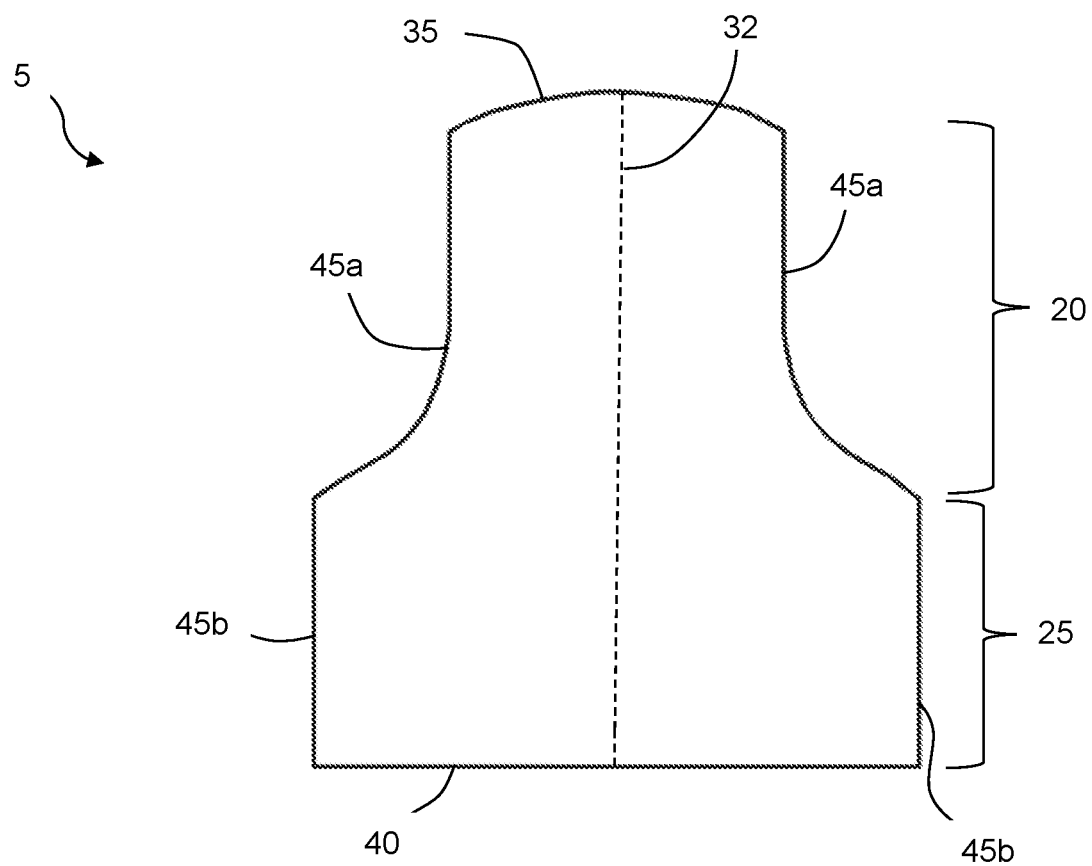
FIG. 3a is a top plan view of a device in accordance with some embodiments of the presently disclosed subject matter.

As illustrated in FIG. 3a, upper section 20 can include side edges 45a that join with lower section side edges 45b. Side edges 45a and/or 45b can be sloped or angled such that top edge 35 is narrower than the device width across bottom edge 40. The width of the top edge and the angle or slope of the side edges are selected to ensure that the upper section does not restrict or interfere with the movement of the head, neck, and/or arms of user 10. Thus, the upper section substantially covers the area around or adjacent to the user's neck and extends to the user's chest and torso. The lower section covers the user's lap and extends to protect at least a portion of the user's thighs. As such, the user can freely drive or perform any of a wide variety of other activities without being adversely affected. Avoiding a restriction or interference to the user's motion also ensures that device 5 is not dislodged (i.e., is not knocked off).

Figure 3B:
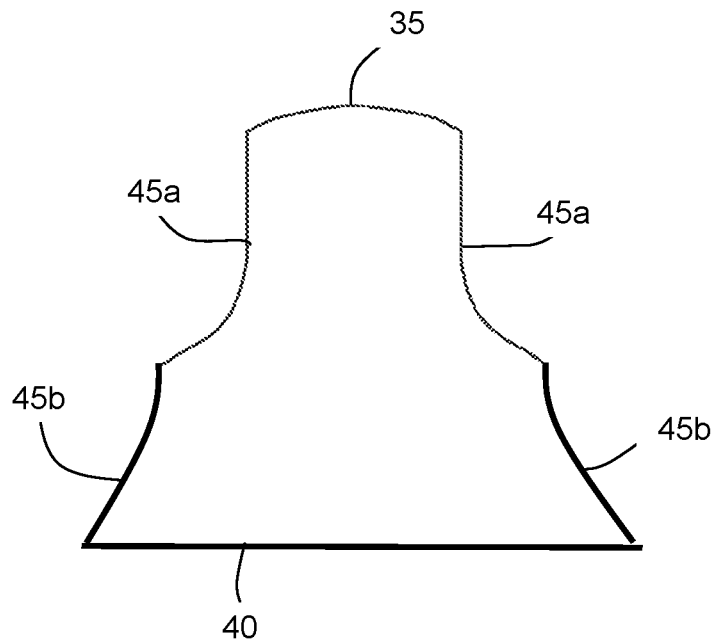
FIG. 3b-3e are top plan views of devices in accordance with some embodiments of the presently disclosed subject matter.
Figure 3C:
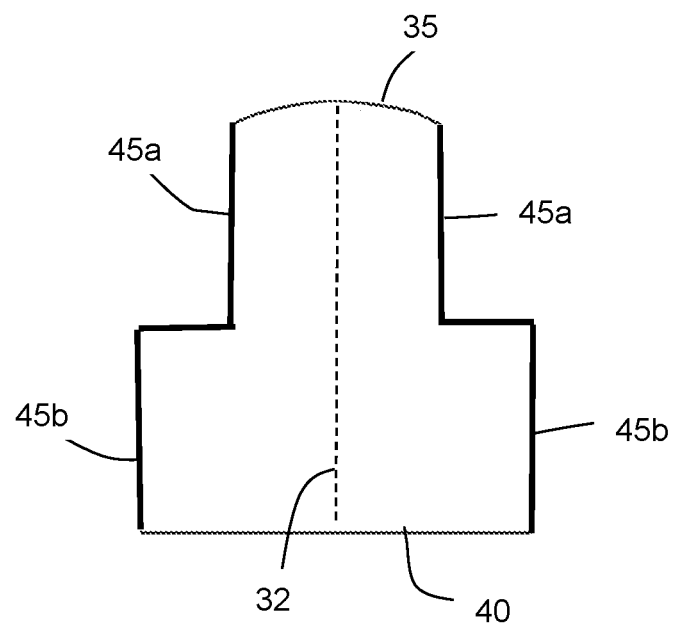
Figure 3D:
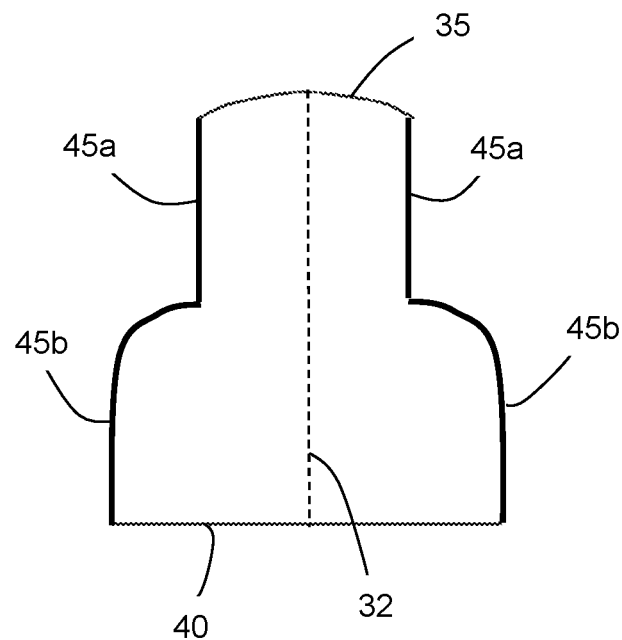

While the upper section side edges are illustrated as being sloped and the lower section side edges are linear in FIG. 3a, the device can have any configuration. For example, both the upper and lower section side edges can be angled, as shown in FIG. 3b. The term "angled" as used herein refers to a curved (e.g., non-linear) or inclined at an angle. Alternatively, one or both of side edges 45a and 45b can be configured parallel to centerline 32 of the device (e.g., linear), as shown in FIGS. 3c-3d.

Figure 3E:
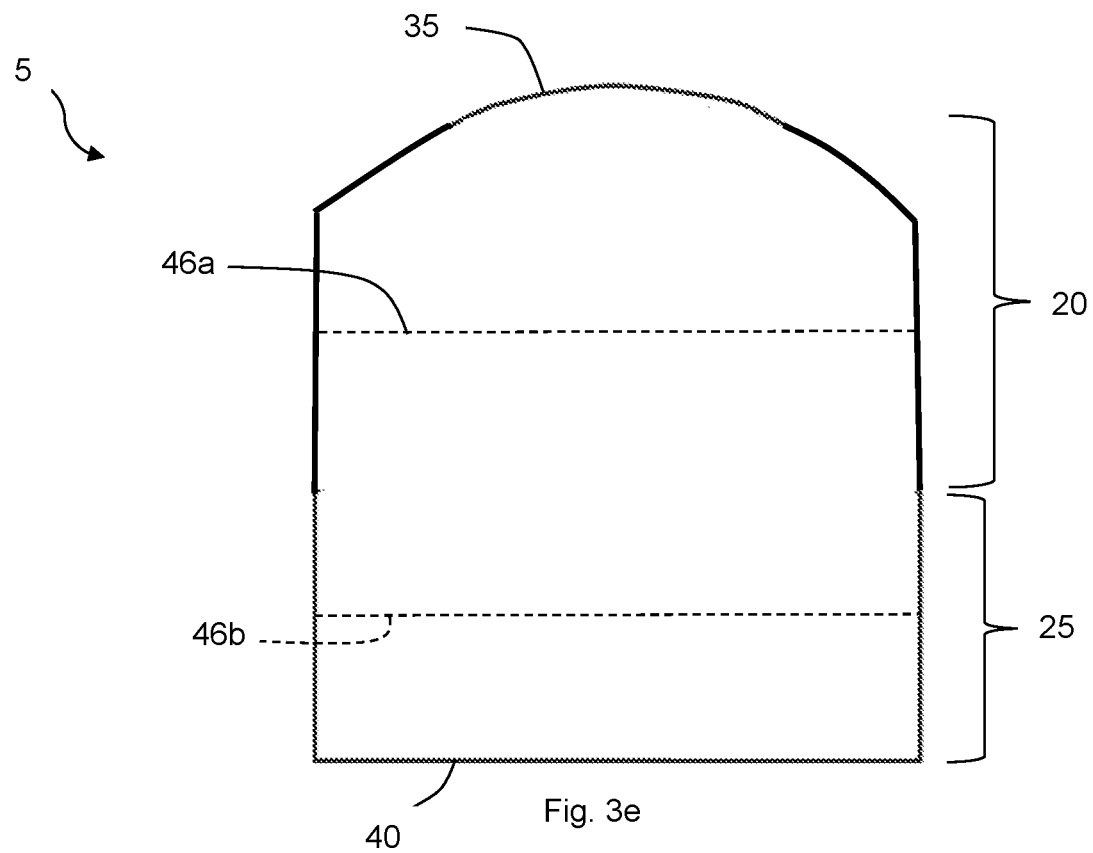
Figure 4E:
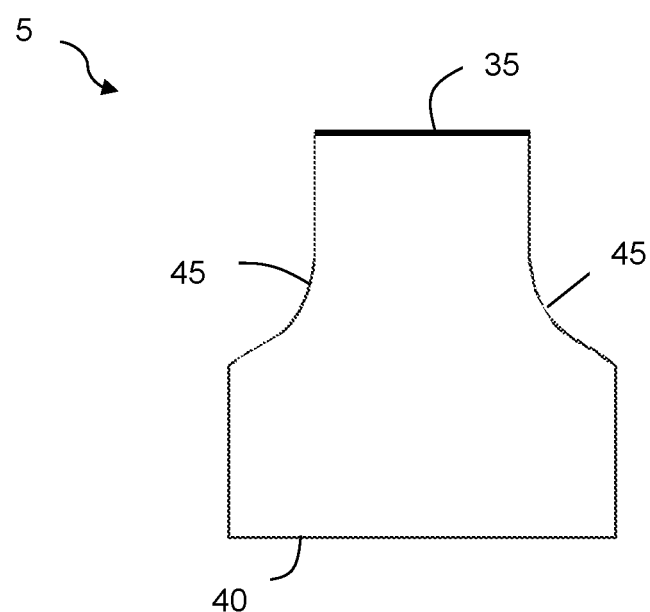
FIG. 4e is a top plan view of a device in accordance with some embodiments of the presently disclosed subject matter.

The width of lower section 25 (and correspondingly the bottom edge 40) is selected such that the lower portion extends across the legs and lower torso of the user. The width of lower edge 40 is selected so the lower portion provides a surface to catch food or liquid spills and to ensure that any spills do not directly impinge upon the individual's lower torso and legs. Width 46a across upper section 20 can be consistent with width 46b across lower section 25, as shown in FIG. 3e. Alternatively, the width across the upper and lower sections can differ, as illustrated in the embodiment of FIG. 3a.

The top and bottom edges of device 5 can further be angled or linear. For example, as shown in FIGS. 4a-4e, top and bottom edges 35, 40 can be angled toward or away from the interior of the device, as well as in a straight line.

It should therefore be appreciated that the configuration and design of the upper and lower sections of device 5 are not limited.

Figure 5:
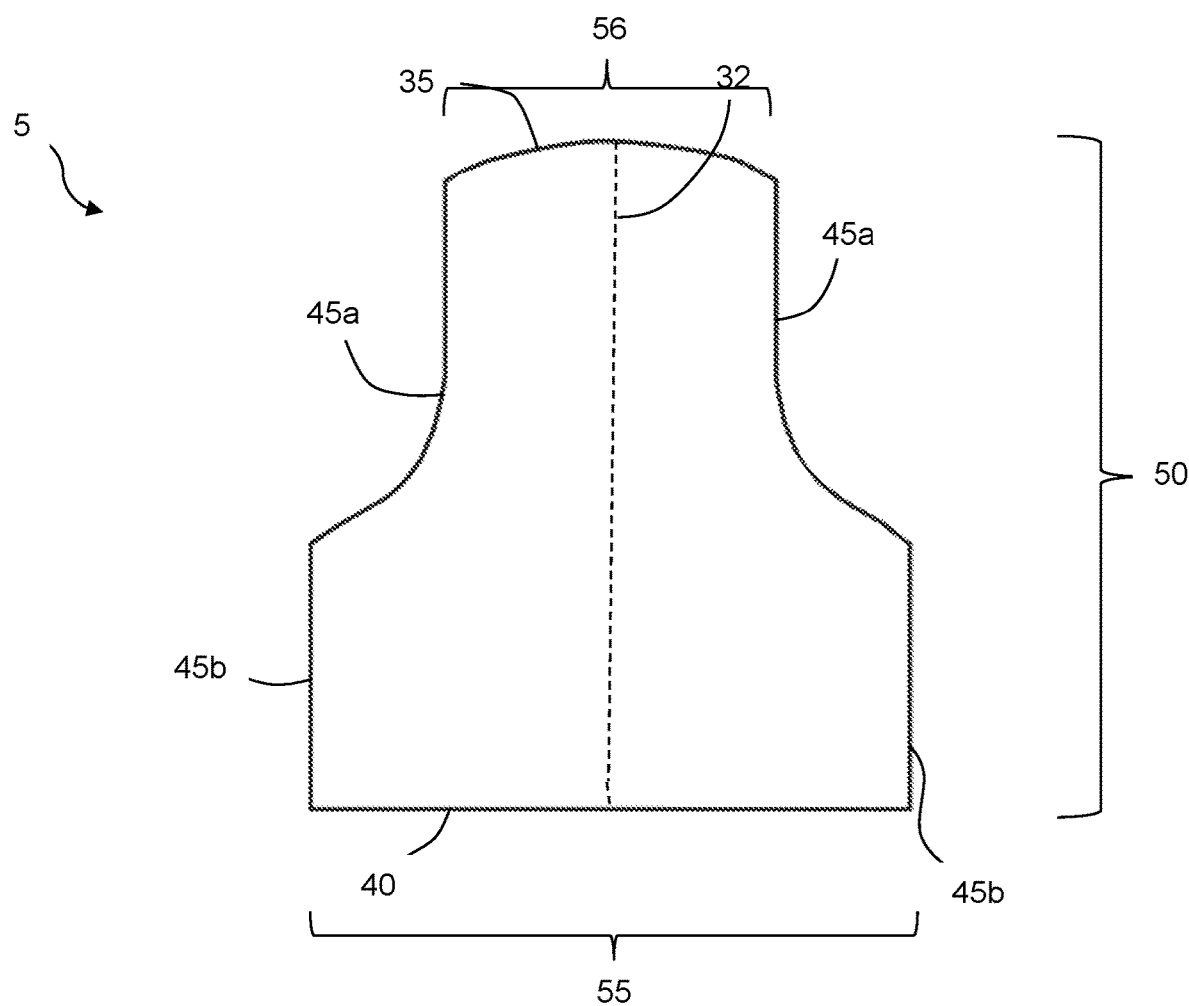
FIG. 5 is a top plan view of a device in accordance with some embodiments of the presently disclosed subject matter.

Device 5 can be configured with length 50 and width 55, as shown in FIG. 5. In some embodiments, the width refers to the longest horizontal distance of the device, and the length refers to the longest vertical distance of the device.

The disclosed device can have any of a wide variety of lengths and widths to suit any user (e.g., adults, children, obese adults). For example, the device can have a length of about 15-50 inches. Thus, device length 50 can be at least about (or no more than about) 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 inches. It should be appreciated that device length 50 is not limited and can be longer or shorter than the range given herein.

Device 5 can include a width of about 12-45 inches. Width 55 can therefore be at least about (or no more than about) 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 inches. In some embodiments, width 56 of top edge 35 can be about 10-40 inches (e.g., at least/no more than about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 inches). It should be appreciated that widths 55, 56 are not limited, and the device can be configured with a width greater or less than the ranges given above.

The device can further have thickness 60 of about 0.5-5 inches. Thus, the device can have a thickness of at least about (or no more than about) 0.5, 1, 1.5, 2, 2.5, 3, 3.5, 4, 4.5, or 5 inches. However, the device is not limited and can be configured with a thickness greater or less than the given range.

Figure 6A:
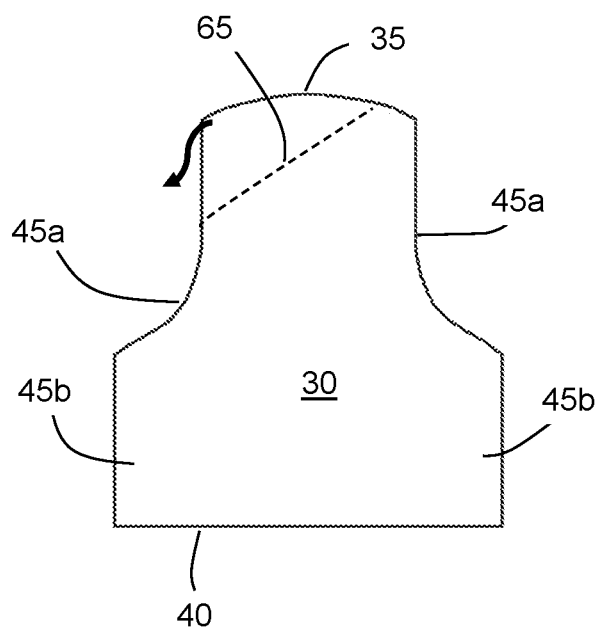
FIGS. 6a and 6b are top plan views of a device folding in accordance with some embodiments of the presently disclosed subject matter.
Figure 6B:
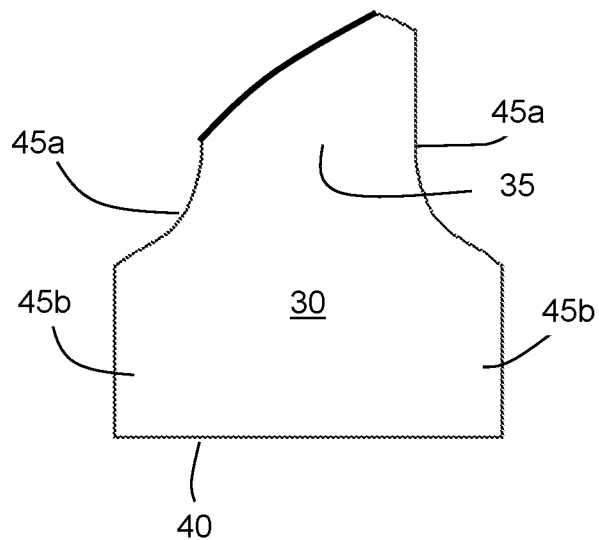
Figure 6C:
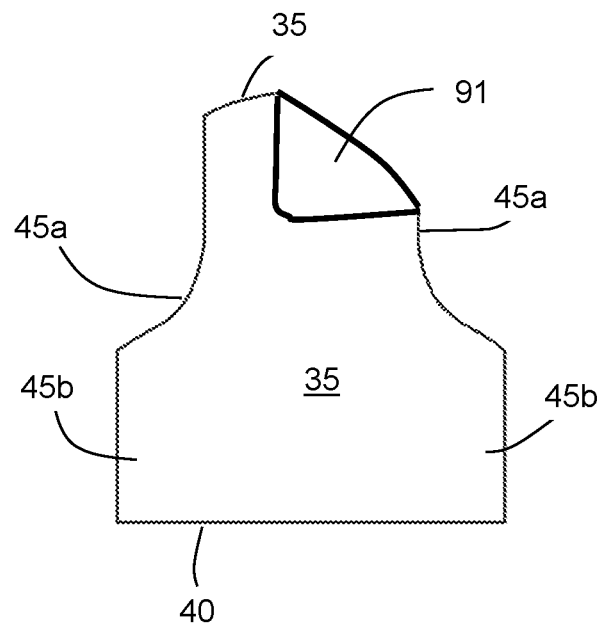
FIG. 6c is a bottom plan view of a folded device in accordance with some embodiments of the presently disclosed subject matter.
Figure 6D:
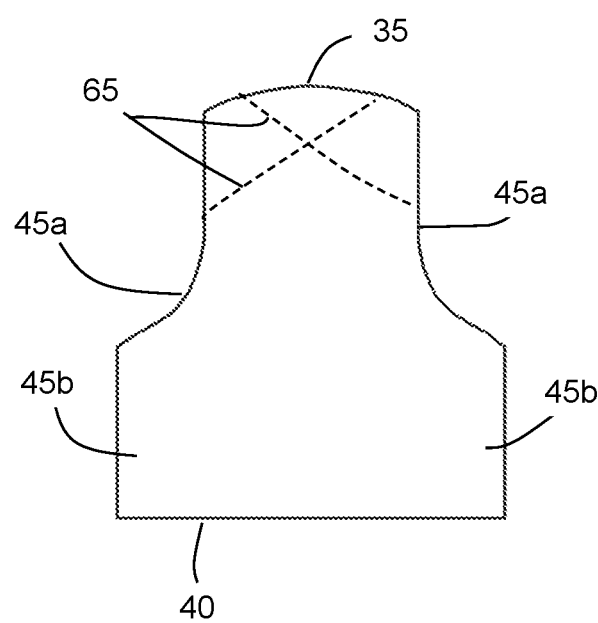
FIG. 6d is a top plan view of a device with a plurality of fold lines in accordance with some embodiments of the presently disclosed subject matter.

At least one upper corner of device 5 is configured to fold down, covering the vehicle seat belt (and held in place against the torso by the tension of the fastened seat belt). One upper corner of the device can be folded in a downward direction, towards device rear face 31, as illustrated in FIG. 6a. FIG. 6b illustrates front face 30 of the device after the corner has been folded towards rear face 31 (e.g., the fold is not visible). FIG. 6c is a lay flat view of the rear face of the device of FIG. 6d, illustrating folded corner 91.

When folded towards the rear face of the device, upper section 20 still sufficiently covers the torso of user 10, including the chest and waist. The upper section is therefore pivotable or foldable about fold line 65 towards the device rear face.

In some embodiments, the device includes a single fold line. In other embodiments, the device includes a pair of fold lines to allow either side to fold, as shown in FIG. 6d.

Fold line 65 can be created using any conventional method. For example, the fold line can be a scored line, a crease, a perforated line, or a seam where two portions of material are joined together. However, it should be appreciated that the fold line is optional, and device 5 can be configured without a fold line (e.g., when the corner is folded at any line or any angle by the user and maintained in position). In other embodiments, the fold line does not have a configuration different from the remainder of the device body (e.g., is just a fold angle desired by the user).

Figure 7A:
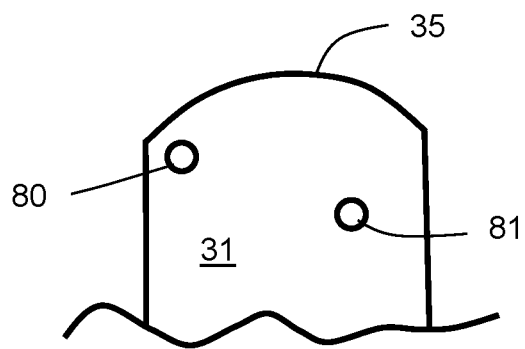
FIGS. 7a-7c are fragmentary bottom plan views of a device comprising securing elements in accordance with some embodiments of the presently disclosed subject matter.
Figure 7B:
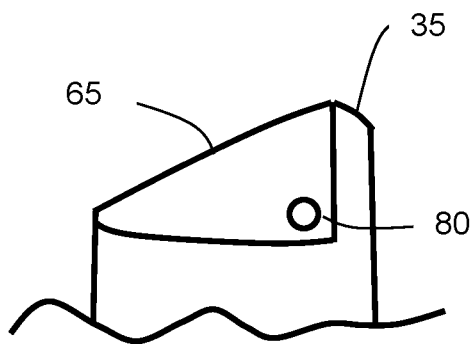

In some embodiments, the folded configuration can be maintained through gravity and/or the tension from an associated seat belt. In other embodiments, the fold can be maintained using VELCRO®, magnets, clips, fasteners, ties, and the like. For example, FIGS. 7a and 7b show one embodiment of upper section 20 comprising first securing element 80 (e.g., a first magnet) that attracts second securing element 81 (e.g., a second magnet). When the first and second securing elements are brought in close proximity to each other, they can be releasably maintained together for a desired amount of time. In this way, the device folded corner can be maintained over a vehicle seat belt to protect the seat belt from drips, spills, and the like.

Figure 7C:
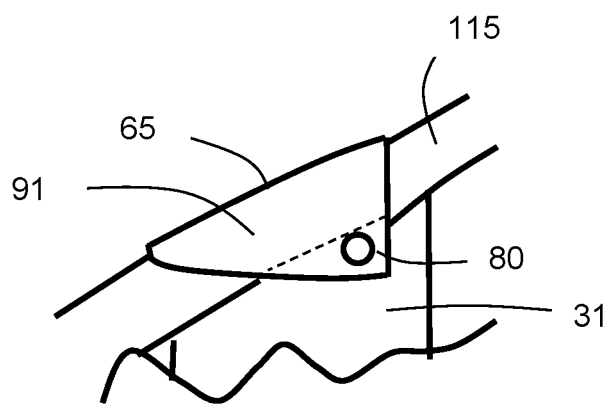

FIG. 7c illustrates one embodiment of device 5 in use with seat belt 115. As shown, the device is folded towards rear face 31 of the device and over the seat belt positioned adjacent to the user's torso. In these embodiments, the tension on the seat belt at least partially holds the device in place. In some embodiments, optional securing elements 80, 81 can be used to further maintain the device is position. In some embodiments, fold 91 can form a channel sized and shaped to maintain a standard seat belt (e.g., via securing elements 80, 81). In some embodiments, the channel can be temporarily formed (e.g., through the use of magnets, clips, VELCRO® and the like) or permanently formed through sewing or other similar technique.

Figure 7D:
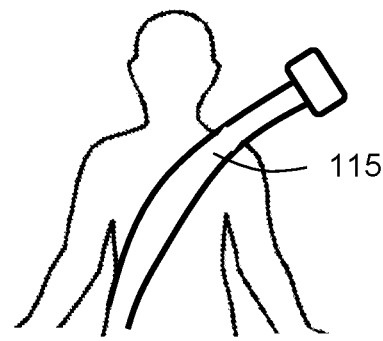
FIGS. 7d-7e are front plan views a device in use with a seat belt in accordance with some embodiments of the presently disclosed subject matter.
Figure 7E:
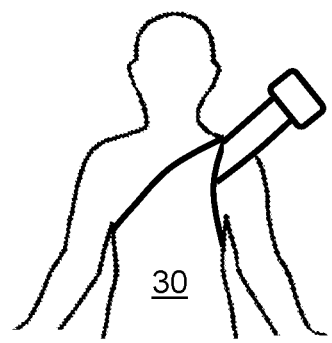
Figure 7F:
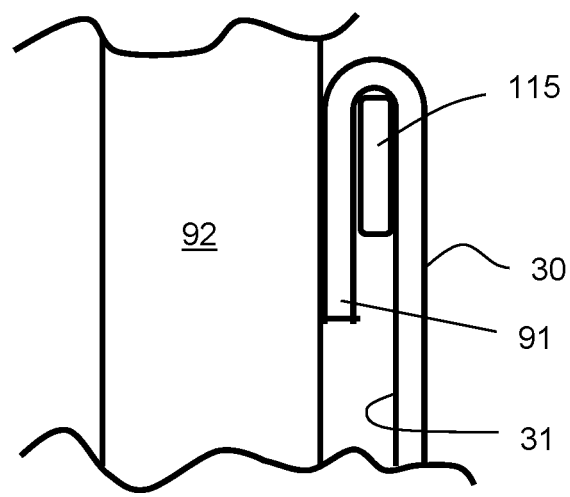
FIG. 7f is a cross-sectional side plan view of a device in use with a seat belt in accordance with some embodiments of the presently disclosed subject matter.

FIG. 7d illustrates that vehicle seat belt 115 can be positioned to directly contact the torso of the user. Device 5 is then positioned over the seat belt, such that fold 91 is maintained between the user's torso and the seat belt. The remainder of the device (e.g., the upper and lower sections) is positioned over the seat belt to cover the user's torso, as shown in FIG. 7e. A cross-sectional view of fold 91 positioned between a user's torso 92 and seat belt 115 is illustrated in FIG. 7f. In these embodiments, the tension from the seat belt on the fold helps to maintain the device on the user.

Figure 8A:
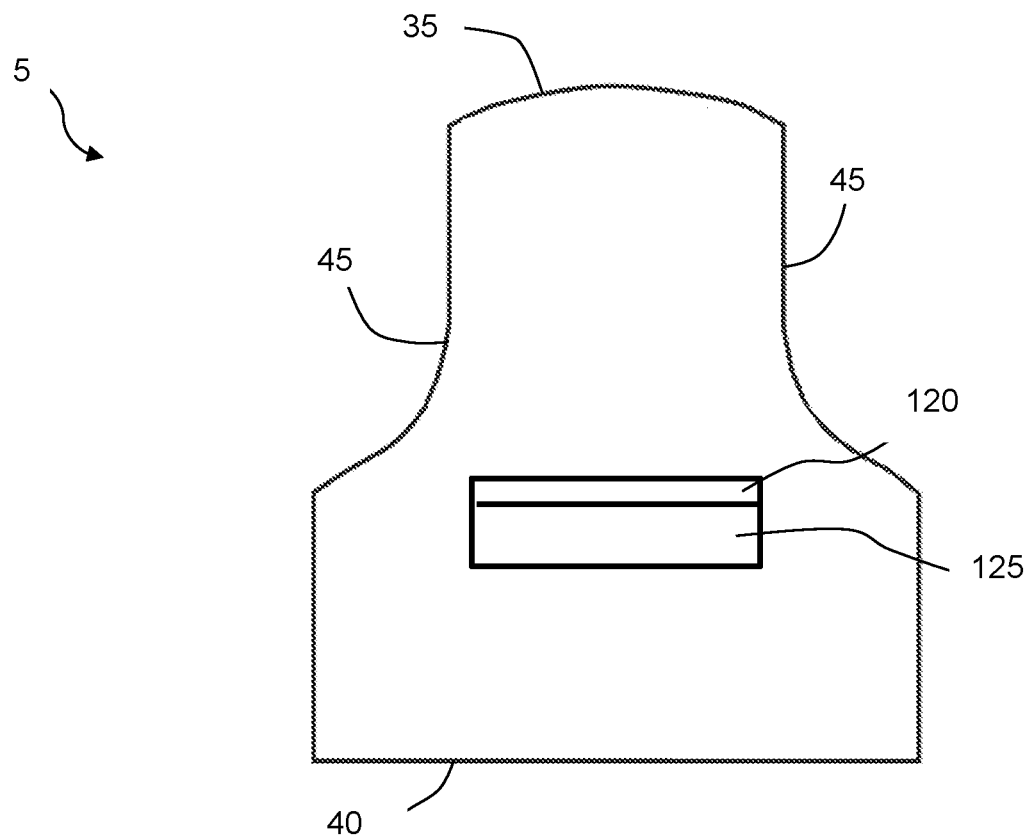
FIG. 8a is a rear plan view of a device in accordance with some embodiments of the presently disclosed subject matter.
Figure 8B:
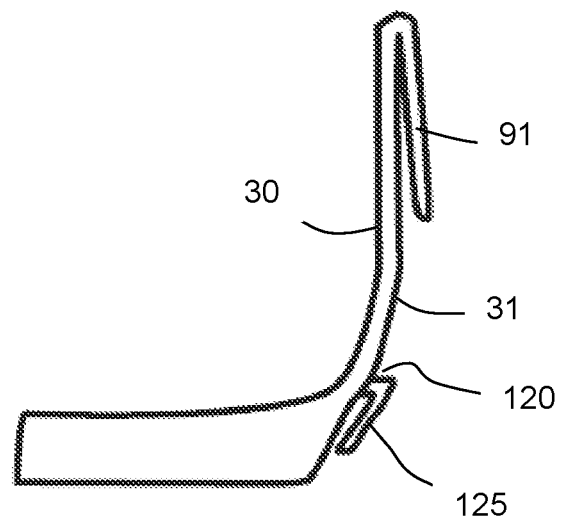
FIG. 8b is a rear plan view of a device in a folded configuration in accordance with some embodiments of the presently disclosed subject matter.

Optionally, device 5 can include a rear flap to ensure that the device remains properly positioned during use. As shown in FIGS. 8a and 8b, the rear flap includes connector 120 that attaches to device rear face 31. The rear flap further includes tab 125 operably attached to the connector. The tab is positioned such that it can overlay the waist portion of fastened seat belt. For example, the rear flap can be positioned on the lower ⅓ of the rear face of the device such that it aligns with the seat belt waist portion. The tab can have any desired length, such as about 3-10 inches. The rear flap can be constructed from any desired materials, such as (but not limited to) fabric, plastic, and the like.

Figure 8C:
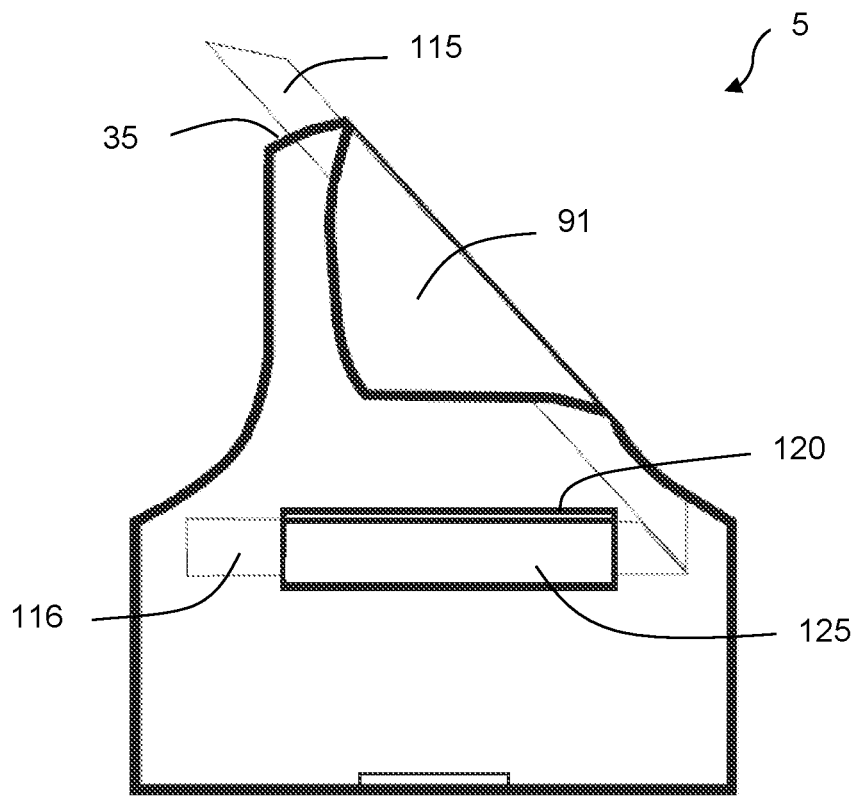
FIG. 8c is a side plan view of a device in a folded configuration in accordance with some embodiments of the presently disclosed subject matter.

In use, tab 125 extends from the connector and is tucked under seat belt waist portion 116, as illustrated in FIG. 8c. In this way, device 5 is further held in place by the tension of the waist portion of the fastened seat belt. It should be appreciated that the rear flap can have any desired configuration.

Figure 9A:
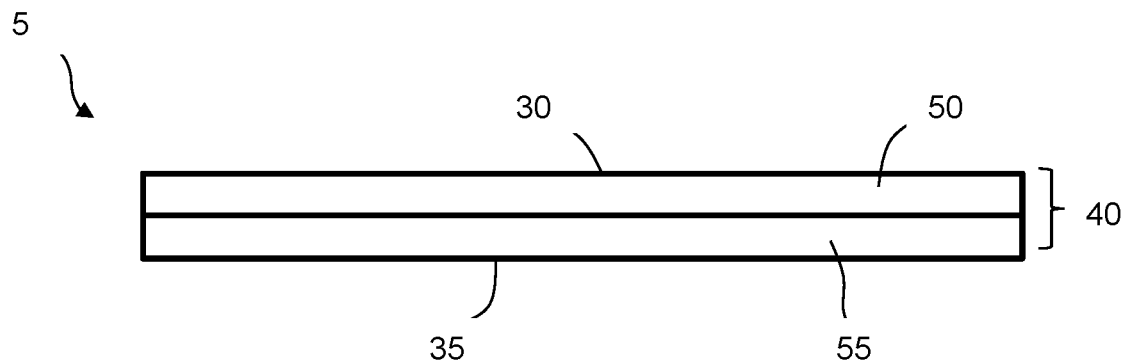
FIG. 9a is a cross sectional view of a device in accordance with some embodiments of the presently disclosed subject matter.

As described above, the disclosed device includes front face 30, rear face 31, and interior 40 positioned between the top and rear faces. The interior includes one more layers. For example, the device can include at least one absorbent layer 90 and at least one backing layer 95, as illustrated in FIG. 9a. The term "absorbent" refers to a layer that absorbs and contains liquid and semi-solid materials. The absorbent layer can be configured adjacent to front face 30 of the device to absorb spills. Absorbent layer 50 can include any suitable material, including (but not limited to) cellulose, fabric, foam, sponge, meltblown polymers, fibers, gelling materials, or combinations thereof.

The backing layer can be positioned adjacent to rear face 31 of the advice (e.g., next to the torso of the user 10). The backing layer can include waterproof and/or liquid impermeable characteristics to prevent spills from reaching the clothing of user 10 and/or the vehicle seat or vehicle interior. The term "waterproof" refers to a material through which liquid cannot pass under normal use conditions (e.g., in the absence of forced pressure). The term "liquid impermeable" refers to a material that does not allow liquids to pass in a direction generally perpendicular to the layer plane at a point of liquid contact during normal use conditions (i.e., eating and drinking in a car). The backing layer can include any suitable material, such as (but not limited to) polymeric material, rubber, vinyl, urethane, plastic foam, silicone, vinyl, urethane, polyolefin, polyester, or combinations thereof.

Figure 9B:
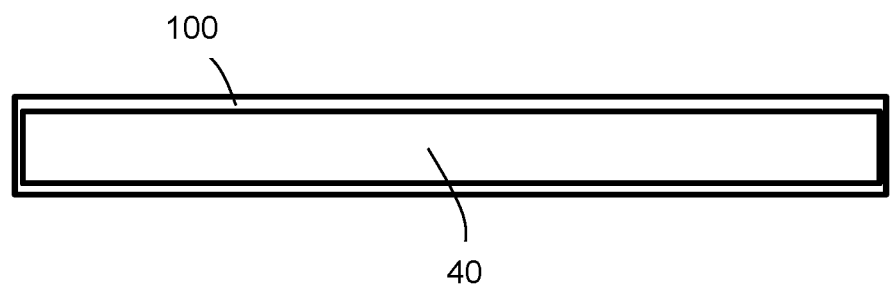
FIG. 9b is a cross sectional view of a device comprising an outer cover in accordance with some embodiments of the presently disclosed subject matter.

In addition to the absorbent layer and backing layer, the disclosed device can further include any other suitable layer. For example, in some embodiments, the device can include outer layer 100 that covers at least one surface of the device (e.g., top and/or rear faces 30, 31), as illustrated in FIG. 9b. In some embodiments, the outer layer can cover the entire outer surface of the device (e.g., like an outer envelope). The outer layer can be constructed in any desired color (red, blue, white, black, purple, etc.) or pattern (stripes, dots, sports team logos, etc.) to provide an aesthetically pleasing appearance. The device can further include a variety of graphics, such as photographs, writing, or images.

The absorbent layer and backing layers can be releasably or permanently attached together using any desired mechanism. For example, in some embodiments, the layers can be sewn together about their outer perimeters. In other embodiments, the device can include an adhesive layer positioned between absorbent layer 50 and backing layer 55. In still other embodiments, an additional heat seal layer is positioned between the absorbent layer and the backing layer. Alternatively, the top and bottom layers can be held together with VELCRO®, clips, buttons, snaps, and the like.

It should be appreciated that the absorbent and backing layers can be configured with any desired thickness.

Figure 10:
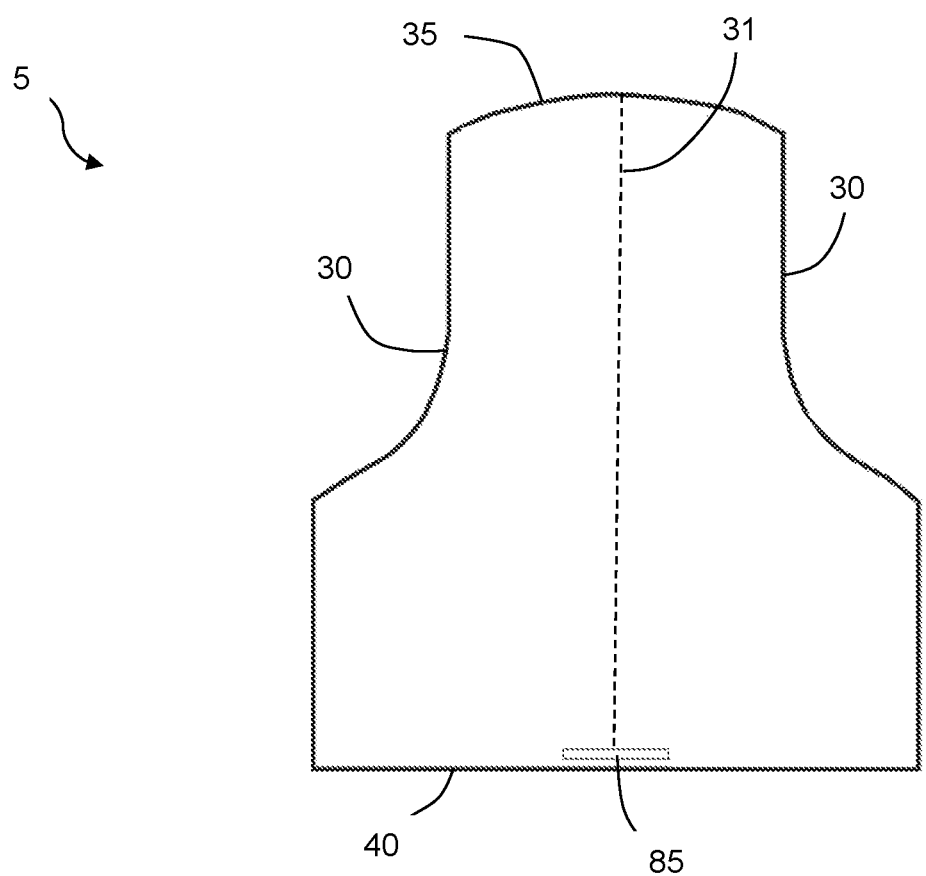
FIG. 10 is a top plan view of a device in accordance with some embodiments of the presently disclosed subject matter.

Optionally the device can include aperture 85 positioned along any edge of the device that can be used for inserting a heating element in cool weather, as shown in FIG. 10. Thus, the aperture can be configured in a top edge, bottom edge, or side edge. Aperture 85 can be any opening that extends into the interior of the device, such as a pocket or channel. The aperture can be opened and closed using any conventional mechanism, including (but not limited to) the use of VELCRO®, buttons, snaps, ties, magnets, clasps, fasteners, and the like.

Figure 11:
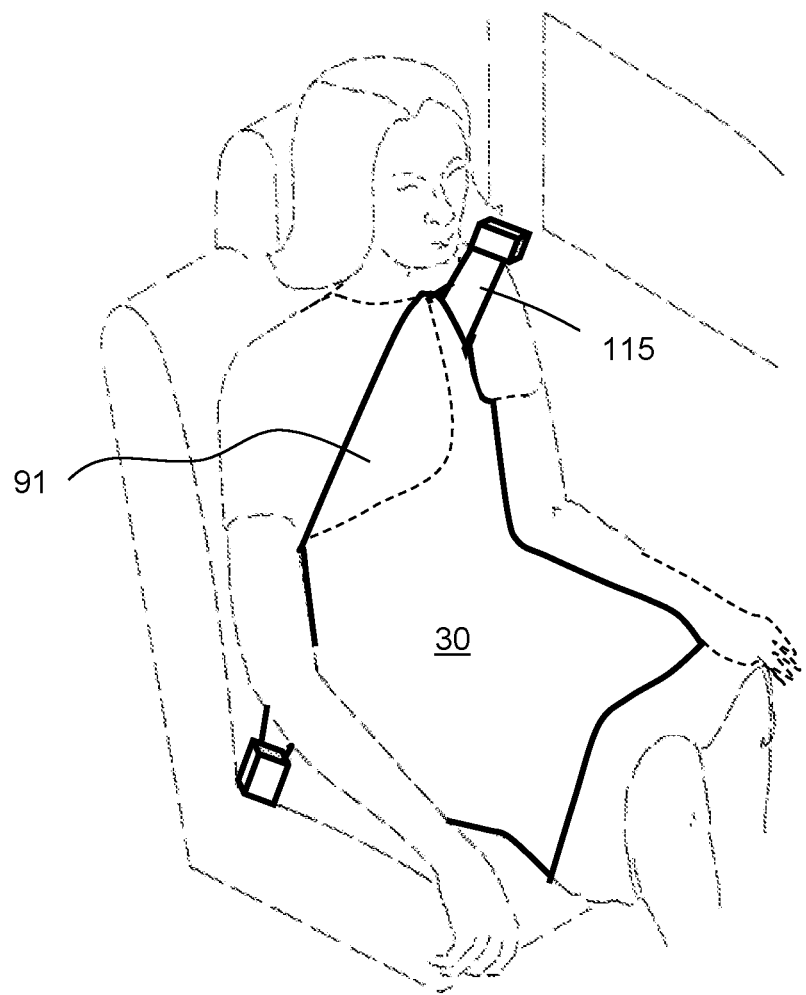
FIG. 11 is a perspective view of a device in use in accordance with some embodiments of the presently disclosed subject matter.

In use, device 5 can be positioned over the front surface of a user while seated, e.g., while riding or driving a vehicle, sitting in a chair, etc. to safeguard clothing and the surrounding environment from spills, stains, or burns (e.g., while the user eats, drinks, or smokes). As shown in FIG. 11, the user can position seat belt 115 in the normal use position. The disclosed device can then be placed over the user's torso and the seatbelt. One upper corner of the device can be folded over the top of the fastened seat belt and positioned between the user's torso and the seat belt. Fold 91 is therefore firmly held adjacent to the user's torso. The seat belt tension exerted on the fold maintains the device in proper position and prevents it from slipping. Thus, the device upper section is maintained in a substantially vertical position on the seated user. The user can then eat or drink while seated as desired. The "up and over" configuration of fold 91 ensures that the entire covered chest portion of the seatbelt (and the user) are protected from stains. Any spilled food or beverages fall directly onto device top surface 30 where they are immediately absorbed by absorbent interior layer 50. Backing layer 55 prevents the spilled food and beverages from traveling through the device and contacting the user's clothing or surrounding environment (e.g., vehicle seat).

After the user is finished eating, they can easily remove device 5. In some embodiments, device 5 is disposable. The term "disposable" refers to an item that can be used once and then discarded or recycled. In other embodiments, a user can reuse device 5 multiple times (e.g., until it becomes soiled or dirty). When the device becomes dirty or soiled, it can be easily laundered using a standard washing machine in some embodiments.

The device can be adapted to be used in a variety of environments. For example, the device can be used with a vehicle driver, where the device is configured to right fold over the seat belt. When the user is a front seat passenger, the device can be further configured to left fold over the seat belt.

During storage, the device can be compactly rolled up or folded, easily being stored in the vehicle trunk, underneath a seat, in a glove box, in an armrest console, etc.

Device 5 offers many advantages over prior art protective devices. Particularly, device 5 does not require an attachment mechanism to maintain the device on the user's person. Rather, tension from the seat belt is sufficient to keep the device on the user.

The disclosed protective device can be used when the user is seated to protect clothing from damage and/or staining caused by a variety of hazards, such as food, beverages, cigarette ashes, cigarette burns, pet hair, pet paws, and the like.

Although primarily described herein with reference to driving, the disclosed device can be beneficial in a variety of environments. For example, the device can be easily used at picnics, sporting events, and other outdoor activities. In addition, the device can be useful in nursing homes and assisted living facilities. The device can also be used to protect a child's clothing when eating. Further, the device can be used when eating in a chair or bed to protect furniture and bedding from spills.

The disclosed device is not cumbersome and does not unduly restrict the motion of the user when performing activities, such as driving.

Advantageously, the disclosed device can be manufactured relatively inexpensively from a wide variety of materials.

Device 5 is also easily adaptable for use by a wide variety of users, including adults, children, and the elderly.

The device can also be configured in different sizes to accommodate different sized users. For example, it can be sized in petite, small, medium, large, and extra large sizes if desired. This sizing can largely be accomplished by shortening or lengthening of the length and/or width of the device.

The device is configured without sleeves to allow the user to efficiently drive or perform other tasks efficiently, without the disclosed device getting in the way.

Advantageously, the device can be maintained on the user during user without the use of physical elements, such as ties and the like. That is, the device is not tied or otherwise held with elements to the user. Rather, the device is self-maintained in position using fold 91. The device can then be held by compression of the associated seat belt when in use and/or through the releasable attachment of the seatbelt within a fold channel or securing elements, as described above.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A device for use by a user seated in a vehicle having a vehicle seat belt, the device comprising:
    a body defined by:
        an upper section for covering at least a portion of the user's front torso while leaving the user's arms and hands uncovered; and
        a lower section extending from the upper section, adapted to cover the seated user's lap and thighs;
    wherein the body comprises a front face, an opposed rear face, an upper edge, a lower edge, and a pair of opposed side edges;
    wherein the body includes at least one fold line positioned in an upper corner of the device, the fold line adapted to allow the upper corner to be folded towards the rear face of a device such that when the device is used with a vehicle seat belt chest strap, the fold is held in place against a user's torso by the tension of the fastened seat belt chest strap;
    wherein the device includes an absorbent layer for absorbing liquid spills and a lower impermeable layer for preventing liquid spills from contacting the seated user or the vehicle.

2. The device of claim 1, wherein the upper section side edges are angled between the top edge and the lower section side edges.

3. The device of claim 1, wherein the upper corner of the device comprises a first securing element that cooperates with a second securing element on the body to maintain the folded configuration.

4. The device of claim 3, wherein the first and second securing elements are selected from one or more magnets, clips, ties, buttons, hook and loop closures, snaps, or fasteners.

5. The device of claim 1, wherein the absorbent layer is positioned adjacent to the front face of the device, and wherein the front face of the device is the farthest face from the user's lap and thighs.

6. The device of claim 1, wherein the lower impermeable layer is positioned adjacent to the rear face of the device, and wherein the rear face of the device is adjacent to the user's lap and thighs.

7. The device of claim 1, further comprising a flap positioned on the rear face of the device, wherein the flap is positioned on the lower third of the rear face and is configured to tuck into a waist belt portion of a seat belt.

8. The device of claim 1, wherein the upper section comprises a left-side and right-side fold line.

9. The device of claim 1, wherein the fold line is a scored line, a crease, a perforated line, a seam, or combinations thereof.

10. The device of claim 1, wherein the folded upper corner is configured as a channel sized and shaped to house the fastened vehicle seat belt chest strap using the tension of the fastened seat belt chest strap to hold firmly against the torso of the user.

11. The device of claim 1, wherein the lower impermeable layer is waterproof, liquid impermeable, or both.

12. The device of claim 1, further comprising an outer cover that spans at least one of the top and rear faces.

13. A method of containing food and beverage spills while seated in a vehicle, the method comprising:
    positioning a device over at least a portion of a user's upper torso, lap, and thighs, wherein the device comprises:

a body defined by:
- an upper section for covering at least a portion of the user's front torso while leaving the user's arms and hands uncovered; and
- a lower section extending from the upper section, adapted to cover the seated user's lap and thighs;

wherein the body comprises a front face, an opposed rear face, an upper edge, a lower edge, and a pair of opposed side edges;

wherein the body includes at least one fold line positioned in an upper corner of the device, the fold line adapted to allow the upper corner to be folded over a vehicle seat belt chest strap;

wherein the device includes an absorbent layer for absorbing liquid spills and a lower impermeable layer for preventing liquid spills from contacting the seated user or the vehicle;

positioning an upper corner of the device to a folded position up and over the seat belt, held in place against the torso of a user by the tension of the fastened upper seat belt chest strap, covering and providing stain protection to a top portion of the vehicle seat belt chest strap;

wherein spills from the user while seated are contained by the device and do not contact the user's clothing or the vehicle.

14. The method of claim 13, wherein the upper corner of the device comprises a first securing element that cooperates with a second securing element on the body to maintain the folded configuration.

15. The method of claim 14, wherein the folded position is maintained in position by the first and second securing elements selected from one or more magnets, clips, ties, buttons, hook and loop closures, snaps, or fasteners.

16. The method of claim 13, wherein the fold is maintained in position against the upper torso by the tension of the fastened seat belt chest strap.

17. The method of claim 13, wherein the absorbent layer is positioned adjacent to the front face of the device, and wherein the front face of the device is the farthest face from the user's lap and thighs.

18. The method of claim 13, wherein the lower impermeable layer is positioned adjacent to the rear face of the device, and wherein the rear face of the device is adjacent to the user's lap and thighs.

19. The method of claim 13, wherein the upper corner is folded into a channel sized and shaped to house at least a portion of the vehicle seat belt chest strap.

20. The method of claim 13, further comprising removing the device from the user, washing the device, and reusing the device.

* * * * *